March 2, 1971  R. M. RICKERSON  3,567,232
ROTARY SEAL
Filed Oct. 30, 1968  2 Sheets-Sheet 1
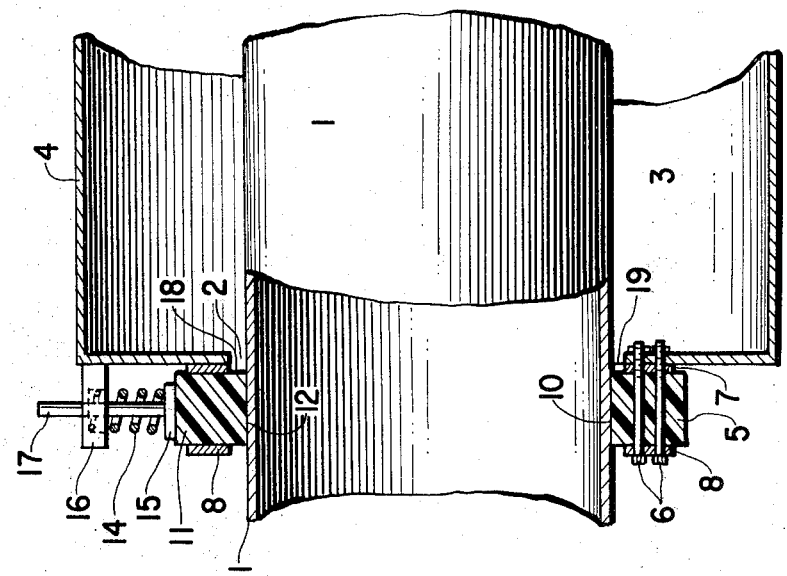
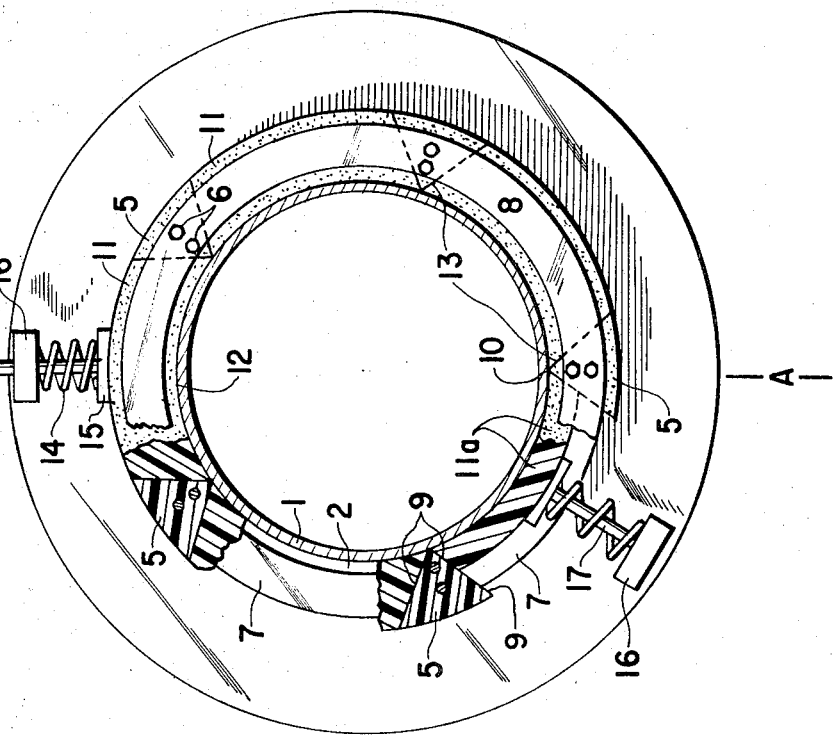
INVENTOR
RAY M. RICKERSON
BY
ATTORNEY

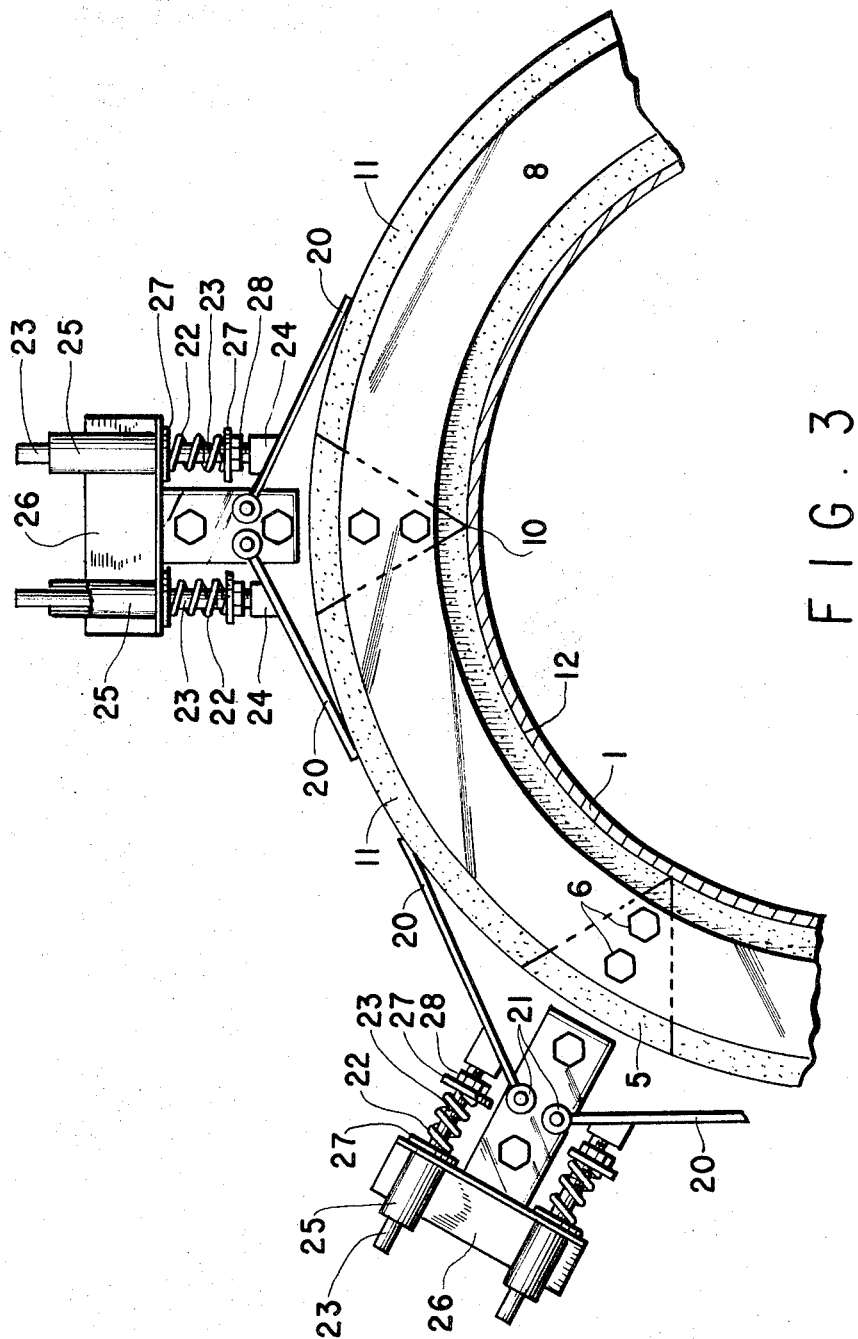

United States Patent Office 3,567,232
Patented Mar. 2, 1971

3,567,232
ROTARY SEAL
Ray M. Rickerson, Conroe, Tex., assignor to
Cities Service Company
Filed Oct. 30, 1968, Ser. No. 771,762
Int. Cl. F16j 15/16
U.S. Cl. 277—148                                   8 Claims

ABSTRACT OF THE DISCLOSURE

A low pressure rotary seal having a plurality of sealing segments and spacers which encircle an essentially cylindrical member and which obstruct an oversize opening through which the cylindrical member extends into a chamber enclosure. Either the cylindrical member or the enclosure may rotate. The sealing segments are radially movable with respect to the axis of the cylindrical member, have parallel end edges and an arcuate inner edge which conforms to the periphery of the member. The sealing spacers are fixedly mounted wedges which are located between the segments and have end edges which are parallel to and in slidable contact with the end edges of adjacent segments. Automatic compensation for wear is effected by continuously urging the segments into contact with the cylindrical member.

BACKGROUND OF THE INVENTION

Field of the invention

The present invention relates to low pressure sealing devices employed for retaining materials within the confines of a chamber which has an oversize wall opening to accommodate an essentially cylindrical member which extends through the chamber enclosure, and either the cylindrical member or the enclosure is rotatable. In one particular aspect the invention relates to sealing devices employed with rotary driers or calciners wherein it is necessary to retain hot gases within the confines of a shell which directs the gases over a substantial length of a rotating drum in which a material is heated, and also for sealing similar openings in stationary end breechings through which material is added to and removed from the ends of the rotating drum.

DESCRIPTION OF THE PRIOR ART

When a cylindrical member extends through an opening in the wall of a chamber enclosure, and either the cylindrical member or the enclosure rotates, it is generally necessary that the opening be significantly larger than the outside diameter of the cylinder in order to assure unhindered rotation. However, if there is a tendency for undesirable leakage of material through the opening, it must be satisfactorily sealed, but sealing cannot be easily accomplished when the cylindrical member is not perfectly round, or when the rotating member oscillates or wobbles to some extent, or when the cylinder expands and contracts due to inconstant temperature. Previously, friction type, labyrinth type and flexible cloth rubbing seals have been employed with materials under low pressure, i.e. less than 1 p.s.i.g. Friction and rubbing type seals have not been altogether satisfactory because of the difficulty in maintaining full contact between the surfaces which maintain the seal, e.g. with an out-of-round cylinder, or when an oscillating motion exists during rotation, it has not been possible to keep the sealing surfaces mated. Labyrinth type seals are expensive and require careful spacing between the fixed and rotating elements lest thermal expansion cause them to bind against one another, whereupon seizing occurs which destroys the seal and/or stops the rotation.

Low pressure friction or rubbing type seals normally comprise an integral seal ring formed from an impervious material which is either (a) fixedly mounted to the cylinder and arranged for sliding contact with the wall that surrounds the opening through which the cylinder extends or (b) fixedly mounted to the wall and arranged for sliding contact with the circumferential surface of the cylinder. The massive size of a rotary calciner or dryer is a contributory source of difficulty when seals of this type are employed. It is not uncommon for the rotating drum thereof to be as much as fifty feet in length and 6 feet in diameter. Even larger drums are in use, and perfect roundness and nonoscillatory rotation are seldom achieved; yet when such misalignment exists, the seal ring wears unevenly so that it must be frequently readjusted or replaced to prevent excessive leakage. If the cylinder expands, as through heating, the sealing element is subjected to distortion from which it may not recover when the cylinder contracts, thus destroying the effectiveness of the seal and necessitating the replacement thereof.

SUMMARY OF THE INVENTION

It is therefore an object of this invention to provide a rotary seal between a cylindrical member and a surrounding enclosure, one of which rotates.

It is another object of this invention to provide a rotary seal which conforms to the external circumference of a cylindrical member that is imperfectly round.

It is a further object of this invention to provide a rotary seal between a cylindrical member and a surrounding enclosure, one of which rotates and slightly oscillates or wobbles during rotation.

It is even another object of this invention to provide a rotary seal that automatically compensates for wear of the sealing elements during continued rotative contact with an essentially cylindrical member.

Still another object is to provide a rotary seal having sealing elements which are not permanently distorted by expansion of an essentially cylindrical member which the elements encircle.

Other objects and advantages of the invention will become apparent from the following description and the appended claims.

The present invention is a self-adjusted rotary seal comprising a plurality of impervious segments and spacers arranged in a ring-shaped pattern around an essentially cylindrical member, and which obstruct an oversized opening in a chamber enclosure wall through which the member extends. Either the cylindrical member or the chamber enclosure may be arranged to rotate.

The spacers are fixedly mounted and located between the segments while the segments are radially movable with regard to the axis of the rotatable member. Each movable segment has an arcuate inner edge for flush contact with the circumferential surface of the rotatable member, and two end edges which are essentially parallel to one another. Each spacer has two end edges which are essentially parallel to and in slidable contact with the end edges of adjacent segments.

Significant longitudinal movement of the segments is prevented so that front to rear contiguity is fully maintained between the end edges of the spacers and segments and between the rear faces of these elements and the enclosure wall which surrounds the opening to be sealed. The spacers are wedge-shaped, having end edges that extend to a tip which proximates the external circumferential surface of the cylinder. The segments are continuously urged radially inward toward the axis of the cylinder, thus forcing the arcuate inner edge of the segments into contact with the circumferential surface of the cylinder.

3

Ideally, the ends of the arcuate inner edges of the sealing segments adjoin one another so that the surface of the cylinder is circumscribed by these surfaces, but in practice the spacers may be somewhat truncated, so that the ends of the inner edges of adjacent segments are slightly separated. Accordingly, the spacers act as guides for the segments, i.e. during rotation of the cylindrical member, each segment can "float" radially inward or outward to compensate for any inward or outward deviation from rotation through a truly circular path. Thus, if the cylinder has a somewhat elliptical or wavy surface, or the rotating member wobbles slightly, the movable segments "float" in or out between the spacers to accommodate the irregularity and thus maintain the seal. Furthermore, as the inner edges of the segments wear down during continued rotative contact with the cylinder, abutment with the circumferential surface is maintained by continuousuly urging the segment inward, thus automatically compensating for the wear.

It will also be apparent that contiguity is maintained between the inner edges of the segments and the surface of the cylindrical member even though the diameter and length of the cylinder may fluctuate slightly because of repeated thermal expansion and contraction. As the diameter of the cylinder increases and decreases, the segments accordingly "float" outwards and inwards. As the length of the member increases and decreases, the surface of the cylinder slides longitudinally over the inner edges of the segments without permanent distortion thereof.

The segments may be urged inwardly for flush contact with the circumferential surface of the cylinder in any desirable manner, but may be conveniently and simply accomplished by applying the force of a tensioned spring to the segments. To particular advantage, independent spring assemblies may be employed with each individual segment.

As previously stated, the sealing mechanism of the present invention may be employed to particular advantage with relatively large rotary calciners or driers wherein the seal obstructs an oversized opening between the walls of the rotary drum and the heated-gas enclosure, or the opening between the walls of the drum and a stationary end breeching. It will be understood, however, that the sealing device of this invention may be employed in other applications when desirable and practical.

The sealing segments and spacers may be constructed from any suitable rigid and impervious material, but if exposed to heat, they may to advantage be formed from a phenolic-asbestos composition such as Gatke or an asbestos-diatomaceous earth composition such as Marinite-32.

Longitudinal contiguity of the segment and spacer end edges and of the segment faces with the enclosure wall which surrounds the oversized opening may be accomplished by any suitable method which retains the segments in a proper longitudinal relationship. Conveniently, an integral retaining ring for the segments may be affixed to the front face of the spacers, thus creating slots between the ring and the enclosure wall and into which the segments can be inserted. In such a case, however, the spacers should be slightly thicker than the segments so as to prevent the binding thereof between the ring and the enclosure wall.

The segmented seal of this invention provides an additional advantage in that the entire seal ring need not be replaced when one portion wears out faster than another. Only worn segments need be replaced, which only requires a few minutes.

The number of segments and spacers used in forming the seal ring can vary depending upon the particular apparatus requiring the seal. At least two segments and two spacers are required, of course, but the number will generally exceed two and depends not only upon the diameter of the cylinder but the extent to which the rotation deviates from a circular path. Eight segments and spacers have, for instance, been employed with a 6 foot diameter rotary drier drum running as much as one-half inch out of round at the sealing locus.

BRIEF DESCRIPTION OF THE DRAWINGS

FIG. 1 is an end view of the seal of this invention being employed with a rotatable drum which extends into a stationary chamber through an oversized opening in the chamber enclosure wall.

FIG. 2 is a section along the line A—A of FIG. 1.

FIG. 3 is an end view of a portion of the sealing device and further illustrates force-applying assemblies for urging the sealing segments into contact with the surface of the rotatable drum.

DESCRIPTION OF THE PREFERRED EMBODIMENTS

In reference to FIGS. 1 and 2, a rotatable drum 1 extends through an oversized opening 2 into a closed chamber 3 bounded by a stationary enclosure wall 4. The drum 1 is supported by trunnion rolls, not shown, located externally of the chamber 3 and positioned so that the drum is essentially centered in the opening 2.

Wedge-shaped spacers 5 are fixedly mounted to the chamber wall 4 by bolts 6, a rigid, segment guide ring 7 being clamped between the rear faces of the spacers and the wall, and a retaining ring 8 being affixed to the front faces of the spacers by the bolts 6. As can be seen from the drawings, the spacers 5 have end edges 9 which extend to an inner tip 10 which abuts, or is proximate to, the circumferential surface of the drum 1.

The fixedly mounted spacers are located between sealing segments 11 which are radially movable with respect to the axis of the drum, and which have an arcuate inner edge 12 for flush contact with the circumferential surface of the drum. In addition, the segments have end edges 13 which are straight and parallel to one another. It can also be seen that the end edges 9 of the spacers are straight and parallel to the end edges 13 of the segments. The length of the segments is sufficient to provide a sliding contact between the spacers and segment end edges without binding as would hamper radial movement. Similarly, the longitudinal spacing between rings 7 and 8 should be sufficient to permit radial movement of the segments, but at the same time sufficiently close to maintain the segments abutted against the ring member 7 which surrounds the opening 2. To effect a proper spacing the spacers 5 may be initially fabricated slightly thicker than the segments, or subsequently made thicker by shimming.

As previously indicated, the segments can be continuously urged inward toward the axis of the drum by means of spring tension in order to maintain the arcuate inner edge of the segment in flush contact with the external circumferential surface of the drum. Advantageously, this may be accomplished by using one or more independent spring assemblies for each segment. As shown in FIGS. 1 and 2, compressed springs 14 are retained between pressure plates 15 and pin guides 16 by means of pins 17. Each pressure plate rests on the outer edge of a segment, the pin being affixed thereto and extending radially through the pin guide. The tension of the spring should be sufficient to continually thrust the segment inward as the segment wears down in width. In FIG. 1, a worn down segment is depicted at 11a, and further illustrates how the segment is guided toward the surface of the drum by the spacers while maintaining contiguity between the end edges and between the arcuate inner edge of the segment and the external circumferential surface of the drum.

Further explaining and nature of the seal, it can be seen from FIGS. 1 and 2 that the opening 2 is substantially completely obstructed by the rear faces 18 of the segments and the rear faces 19 of the spacers, all of which are in flush abutment with ring member 7 which surrounds opening 2. The rear face of each segment extends to the arcuate inner edge and to the parallel end edges thereof. The rear face of each spacer extends to the inner tip and to the end edges thereof.

To minimize leakage between the segments and the circumferential surface of the drum, the arcuate inner edges of the segments should be essentially parallel to and in firm but slidable contact with the drum surface. In addition, the inner tips of the spacers are preferably pointed and proximal to the drum surface, but may be somewhat truncated and/or slightly removed from the surface.

The segments and spacers are illustrated in FIGS. 1 and 2 as being abutted against a rear guide ring 7 in order to effect closure of the opening 2, and the ring is, in fact, a part of the enclosure wall which surrounds the opening. In other embodiments the faces of the segments and spacers may be abutted against the enclosure wall proper, when the wall is sufficiently rigid and adapted to permit free inward movement of the segments. In other instances, the opening 2 may be elongated, as would result from the use of a chamber wall extension having a diameter significantly different from the chamber enclosure, and in which cases the sealing segments and spacers abut the wall of the extension or a flange attached thereto. Thus the expression "wall of the enclosure which surrounds the oversize opening" is intended to include any structural member which surrounds the opening and which, in effect, is integral with the chamber enclosure wall.

As previously pointed out, either the cylindrical member or the chamber enclosure may rotate when practicing the invention. In other words, the cylindrical member may rotate while the chamber enclosure is immobile, or vice versa. The invention has already been explained, with reference to FIGS. 1 and 2, of embodiments wherein the cylinder 1 rotates while the enclosure 4 remains stationary. Thus, enclosure 4 can be a calciner shell which directs hot gases over a substantial length of cylinder 4, the cylinder being a rotary drum in which material is heated. On the other hand, the enclosure 4 can be an end breeching for the rotary drum, and by means of which material is added to or removed from the drum. It will be appreciated, however, that enclosure 4 can be made rotatable while receiving material into the chamber 3 from the cylindrical member 1, even though the latter be immobilized. Accordingly, it is also within the scope of the invention for both the cylindrical member and the chamber enclosure to rotate, but at different speeds.

Since the seal of the present invention is primarily intended for low pressure applications, i.e. less than 1 p.s.i.g., it may be employed to advantage with gases, aerosols or highly fluid solids under low pressure. The invention is especially adaptable to large cylindrical members, i.e. in excess of 1 foot diameter, and more particularly in excess of about 3 feet in diameter, but it will be understood that it can be adapted to smaller cylinders.

FIG. 3 illustrates an alternate manner in which the force of one or more tensioned springs may be applied to each segment in order to urge the arcuate edges thereof into contact with the circumferential surface of the cylindrical member. Generally the force arms 20 have one end pivotally connected at 21 with the other end in firm contact with a sealing segment 11. Tensioned springs 22 exerts an inward force upon the force arm between the ends thereof. The force arm thus continuously urges the sealing segment inward and into contact with the circumferential surface of the cylindrical member. More particularly, the tensioned springs 22 are retained in positions by a guide pin 23 which rests in a socket 24 attached to the force arm and which extends outwardly into an elongated pin guide 25. The pin guides can be affixed directly to the enclosure wall 4, but more conveniently to a bracket 26 which bolts onto the wall. The upper and lower ends of the springs 22 may abut the ends of the pin guides 25 and the sockets 24 directly, but otherwise washers 27 may be employed while using a threaded nut 28 for adjusting the tension of the spring.

It will be understood that various changes may be made in the apparatus and arrangements thereof, which have been referred to herein to explain the nature of the invention, without departing from its spirit or scope as expressed in the appended claims.

Therefore what is claimed is:

1. In apparatus having a chamber enclosure and an essentially cylindrical member, one of which is rotatable, and the cylindrical member extends into said chamber through an oversize opening in the wall of said enclosure, a self-adjusting rotary seal for said opening comprising:
   (a) a plurality of sealing segments and spacers which encircle said cylindrical member and which obstruct said opening through which the cylindrical member extends, said segments being radially movable with respect to the axis of said cylinder, said spacers being fixedly mounted between said segments, each of said segments having end edges which are essentially parallel to one another and each of said spacers having end edges which are essentially parallel to and in sliding contact with the end edges of segments adjacent thereto,
   (b) at least one independent spring assembly for each of said segments, the spring assmblies being adapted to urge said segments into contact with the circumferential surface of said cylindrical member by spring tension, and wherein said spring assembly comprises
      (1) a force arm having a pivotally connected end and the other end in contact with a sealing segment, and
      (2) a spring under tension which exerts an inward force upon said arm between the ends thereof, whereby the oversized opening in said chamber enclosure is sealed against passage of substantial amounts of material, and the sealing segments are maintained flush against the circumferential surface of said cylindrical member during continued rotative contact therewith.

2. In apparatus having a chamber enclosure and a cylindrical member, one of which is rotatable, and the cylindrical member extends into said chamber through an oversize opening in the wall of said enclosure, a self-adjusting rotary seal for said opening comprising:
   (a) a plurality of impervious segments and spacers which encircle said cylindrical member and obstruct said opening through which said cylindrical member extends, said segments and spacers operatively abutting the wall of the enclosure which surrounds said oversize opening, said segments being radially movable with respect to the axis of said cylindrical member and said spacers being fixedly mounted between said segments, each of said segments having end edges which are parallel to one another and an arcuate lower edge in flush contact with the circumferential surface of the cylindrical member, each of said spacers having a tip edge proximate to the circumferential surface of said cylindrical member and end edges which are parallel and in sliding contact with the end edges of segments adjacent thereto; said spacers being slightly thicker than said segments,
   (b) a retaining ring which maintains said segments operatively in abutment with the wall of the enclosure which surrounds said opening while also maintaining said segments in contiguity with the ends of said spacers, said retaining ring being affixed to the front face of said spacers,
   (c) means for continuously forcing the arcuate inner edges of said segments into firm, flush and slidable contact with the external circumferential periphery of said cylindrical member, whereby the oversized opening in the wall of the chamber enclosure is sealed against passage of substantial amounts of material, and the impervious segments are maintained in flush contact with the circumferential surface of said cylindrical member during continued rotative contact therewith.

3. Apparatus of claim 2 in which the essentially cylindrical member rotates and the chamber enclosure is stationary.

4. Apparatus of claim 3 in which the cylindrical member is a rotating drum within which the material is conveyed from one point to another and the chamber enclosure is a stationary breeching into which one end of the drum extends.

5. The apparatus of claim 2 in which the essentially cylindrical member is stationary and the chamber enclosure rotates.

6. The apparatus of claim 2 in which the sealing segments are formed from an asbestos-diatomaceous earth composition.

7. The apparatus of claim 2 in which the sealing segments are formed from a phenolic-asbestos composition.

8. In apparatus having a chamber enclosure and a large diameter rotatable drum wherein material is heated and which is imperfectly round and wobbles or oscillates slightly during the rotation thereof and which extends into said chamber through an oversize opening in the wall of said enclosure, a self-adjusting rotary seal for said opening comprising:

(a) a plurality of impervious segments and spacers which encircle said rotatable drum and obstruct said opening through which the drum extends, said segments and spacers operatively abutting the wall of the enclosure which surrounds said oversize opening, said segments being radially movable with respect to the axis of said rotatable drum and said spacers being fixedly mounted between said segments, each of said segments having end edges which are parallel to one another and an arcuate lower edge in flush contact with the circumferential surface of the rotatable drum, each of said spacers having a tip edge proximate to the circumferential surface of said rotatable drum and end edges which are parallel and in sliding contact with the end edges of segments adjacent thereto, (b) means for maintaining said segments operatively in abutment with the wall of the enclosure which surrounds said opening and in contiguity with the ends of said spacers, and (c) means for continuously forcing the arcuate inner edges of said segments into firm, flush and slidable contact with the external circumferential periphery of said rotatable drum, whereby the oversized opening in the wall of the chamber enclosure is sealed against passage of substantial amounts of material, and the impervious segments are maintained in flush contact with the circumferential surface of said rotatable drum during continued rotative contact therewith.

References Cited
UNITED STATES PATENTS 852,701    5/1907    Bryant _____ 277—148
1,689,874   10/1928   Jabs _____ 277—148X MILTON KAUFMAN, Primary Examiner